(12) United States Patent
Honda

(10) Patent No.: US 11,506,682 B2
(45) Date of Patent: Nov. 22, 2022

(54) TIRE STATE DETECTION SYSTEM, TIRE STATE DETECTION METHOD, AND TIRE STATE DETECTION PROGRAM

(71) Applicant: BRIDGESTONE CORPORATION, Tokyo (JP)

(72) Inventor: Kyohei Honda, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 17/271,305

(22) PCT Filed: Aug. 13, 2019

(86) PCT No.: PCT/JP2019/031834
§ 371 (c)(1),
(2) Date: Feb. 25, 2021

(87) PCT Pub. No.: WO2020/045079
PCT Pub. Date: Mar. 5, 2020

(65) Prior Publication Data
US 2021/0199686 A1   Jul. 1, 2021

(30) Foreign Application Priority Data
Aug. 28, 2018   (JP) .............................. JP2018-159287

(51) Int. Cl.
*G01P 15/18*   (2013.01)
*B60C 23/04*   (2006.01)
(Continued)

(52) U.S. Cl.
CPC .......... *G01P 15/08* (2013.01); *B60C 23/0488* (2013.01); *B60C 23/0493* (2013.01);
(Continued)

(58) Field of Classification Search
CPC . G01P 15/18; G01P 3/44; B60C 99/00; B60C 23/0493; B60C 23/0488
See application file for complete search history.

(56) References Cited

U.S. PATENT DOCUMENTS 6,237,403 B1   5/2001 Oldenettel et al.
2007/0255510 A1   11/2007 Mancosu et al.
(Continued)

FOREIGN PATENT DOCUMENTS

JP    09-211011 A    8/1997
JP    2002-511813 A    4/2002
(Continued)

OTHER PUBLICATIONS

International Search Report for PCT/JP2019/031834, dated Nov. 5, 2019.
(Continued)

*Primary Examiner* — Helen C Kwok
(74) *Attorney, Agent, or Firm* — Sughrue Mion, PLLC

(57) ABSTRACT

A processing device (120) of a tire state detection system (100) is provided with an acceleration data acquisition unit (123) for acquiring the acceleration data detected by an acceleration sensor (111) at every predetermined acquisition interval, an acceleration data extraction unit (125) for extracting the maximum acceleration data indicating at least the maximum acceleration and the intermediate acceleration data indicating the intermediate acceleration excluding the minimum acceleration data indicating the minimum acceleration from 3 or more acceleration data acquired sequentially, and a calculation unit (127) for executing an calculation using the extracted intermediate acceleration data.

10 Claims, 3 Drawing Sheets

(51) Int. Cl.
*G01P 3/44* (2006.01)
*G01P 15/08* (2006.01)
*G01C 22/02* (2006.01)

(52) U.S. Cl.
CPC ............... *G01C 22/02* (2013.01); *G01P 3/44* (2013.01); *G01P 15/18* (2013.01)

(56) References Cited

U.S. PATENT DOCUMENTS

| | | | |
|---|---|---|---|
| 2011/0082663 A1 | 4/2011 | Geisler et al. | |
| 2011/0118989 A1* | 5/2011 | Morinaga | B60C 11/24 |
| | | | 702/34 |
| 2013/0131915 A1* | 5/2013 | Masago | G01M 17/02 |
| | | | 701/33.9 |
| 2013/0179113 A1 | 7/2013 | Guinart | |
| 2015/0090023 A1* | 4/2015 | Masago | G01M 17/025 |
| | | | 73/146 |
| 2019/0025113 A1* | 1/2019 | Masago | G01M 17/02 |
| 2019/0118591 A1 | 4/2019 | Kollmitzer et al. | |
| 2021/0164868 A1* | 6/2021 | Wakao | B60C 23/0479 |
| 2021/0325240 A1* | 10/2021 | Ishii | B60C 23/0493 |

FOREIGN PATENT DOCUMENTS

| | | | |
|---|---|---|---|
| JP | 2012-245888 A | | 12/2012 |
| JP | 2017-072396 A | | 4/2017 |
| JP | 2018-099936 | * | 6/2018 |
| WO | 2017/061320 A1 | | 4/2017 |

OTHER PUBLICATIONS

Extended European Search Report dated Mar. 1, 2022 from the European Patent Office in EP Application No. 19855982.5.

\* cited by examiner

TIRE STATE DETECTION SYSTEM, TIRE STATE DETECTION METHOD, AND TIRE STATE DETECTION PROGRAM

TECHNICAL FIELD

The present invention relates to a tire state detection system, a tire state detection method, and a tire state detection program using an acceleration sensor mounted on the inner surface of a tread of a tire.

BACKGROUND ART

Conventionally, there has been known an apparatus in which an acceleration sensor (accelerometer) is mounted inside a tire/wheel assembly in which a tire is mounted on a rim wheel, and the speed and traveling distance of a vehicle mounted with the tire/wheel assembly are calculated based on acceleration data detected by the acceleration sensor (See Patent Literature 1.).

Specifically, a sensor unit including an acceleration sensor is attached to the rim wheel as integrated with the air valve.

CITATION LIST

Patent Literature

[PTL 1] WO 2017/061320

SUMMARY OF INVENTION

Recently, an acceleration sensor is also used for detecting the road surface condition, but in such a case, it is preferable to mount the acceleration sensor on the inner surface of the tread of the tire.

When the acceleration sensor is mounted on the inner surface of the tread, when a part of the tread corresponding to the mounting position of the acceleration sensor touches the ground, the part of the tread is deformed, so that the detected acceleration (centrifugal acceleration) in the tire radial direction is momentarily largely dropped.

Therefore, an object of the present invention is to provide a tire state detection system, a tire state detection method, and a tire state detection program capable of detecting a tire state without being affected by the grounding of a portion of the tread corresponding to the mounting position of the acceleration sensor even when the acceleration sensor is mounted on the inner surface of the tread of the tire.

One aspect of the present invention is a tire state detection system (Tire state detection system 100) using an acceleration sensor (Acceleration sensor 111) mounted on an inner surface of a tread (Tread 20) of a tire (Pneumatic tire 10) including an acceleration data acquisition unit (Acceleration data acquisition unit 123) for acquiring acceleration data detected by the acceleration sensor at every predetermined acquisition interval (acquisition interval Tac), an acceleration data extraction unit (Acceleration data extraction unit 125) for extracting at least maximum acceleration data indicating a maximum acceleration and intermediate acceleration data (Acceleration data D3) indicating an intermediate acceleration excluding minimum acceleration data indicating a minimum acceleration from three or more acceleration data sequentially acquired by the acceleration data acquisition unit, and a calculation unit (calculation unit 127) for executing a calculation using the intermediate acceleration data extracted by the acceleration data extraction unit One aspect of the present invention is a tire state detection method using an acceleration sensor mounted on an inner surface of a tread of a tire. The tire state detection method comprising the steps of acquiring acceleration data detected by the acceleration sensor at every predetermined acquisition interval, extracting at least maximum acceleration data indicating a maximum acceleration and intermediate acceleration data indicating an intermediate acceleration excluding minimum acceleration data indicating a minimum acceleration from three or more acceleration data acquired sequentially, and executing a calculation using the extracted intermediate acceleration data.

One aspect of the present invention is a tire state detection program using acceleration data detected by an acceleration sensor mounted on an inner surface of a tread of a tire. The tire state detection program causing a computer to execute a process of acquiring the acceleration data at each predetermined acquisition interval, a process of extracting at least maximum acceleration data indicating a maximum acceleration and intermediate acceleration data indicating an intermediate acceleration excluding minimum acceleration data indicating a minimum acceleration from three or more acceleration data acquired sequentially, and a process of executing a calculation using the extracted intermediate acceleration data.

DESCRIPTION OF EMBODIMENTS

Figure 1:
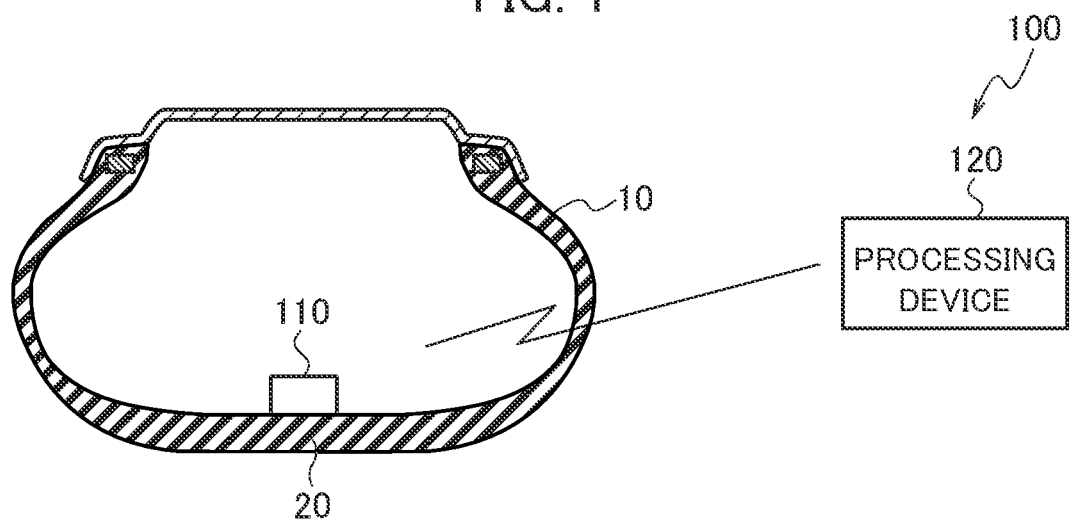
FIG. 1 is an overall schematic diagram of a tire state detection system 100.

Hereinafter, an embodiment will be described based on the drawings. It should be noted that the same or similar reference numerals are given to the same functions and structures, and the description thereof will be omitted as appropriate.

(1) Overall Schematic Configuration of the Tire State Detection System

FIG. 1 is an overall schematic configuration diagram of a tire state detection system 100 according to the present embodiment. As shown in FIG. 1, the tire state detection system 100 comprises a sensor unit 110 and a processing device 120.

The tire state detection system 100 includes an acceleration sensor mounted on the inner surface of a tread 20 of the pneumatic tire 10 (Tire).

Specifically, as will be described later, the sensor unit 110 includes various sensors and batteries for detecting acceleration in a predetermined direction, such as in the tire radial direction.

The sensor unit 110 is mounted on the inner surface of the tread 20 of the pneumatic tire 10. FIG. 1 shows a cross-sectional shape in the tire width direction of the pneumatic tire 10 assembled to a rim wheel. The sensor unit 110 may also include a sensor for detecting temperature and pressure (tire pressure) in addition to acceleration.

One sensor unit 110 may be provided in the tire circumferential direction. In view of the fact that the ground contact surface of the tread 20 is deformed when the vehicle turns left and right, the sensor unit 110 is preferably provided at the center of the tread 20 in the tire width direction.

The processing device 120 realizes wireless communication with the sensor unit 110 and acquires data detected by the sensor unit 110. The processing device 120 is implemented by hardware, such as a communication module, including a processor, a memory, and an antenna.

The processing device 120 is usually provided in a vehicle on which the pneumatic tire 10 is mounted. In this case, the processing device 120 may be implemented by an electronic control unit (ECU) mounted on a vehicle. Alternatively, the processing device 120 may be implemented on a server computer connected via a wireless communication network, rather than on a vehicle.

(2) Function Block Configuration of Tire State Detection System

Figure 2:
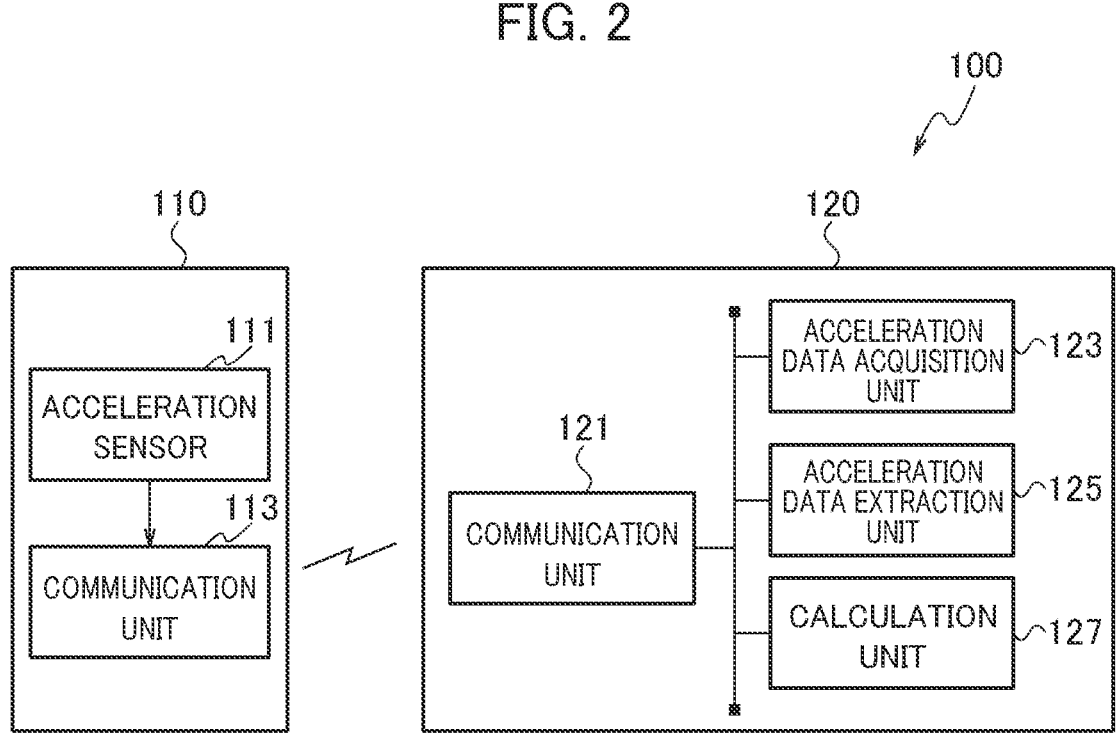
FIG. 2 is a functional block diagram of a tire state detection system 100.

FIG. 2 is a functional block diagram of the tire state detection system 100. As shown in FIG. 2, the sensor unit 110 includes an acceleration sensor 111 and a communication unit 113. The processing device 120 includes a communication unit 121, an acceleration data acquisition unit 123, an acceleration data extraction unit 125, and a calculation unit 127.

The acceleration sensor 111 detects acceleration in a predetermined direction of the pneumatic tire 10. In the present embodiment, the acceleration sensor 111 detects acceleration of the pneumatic tire 10 in the tire radial direction, specifically, centrifugal acceleration (May be called centrifugal force).

As the acceleration sensor 111, a general-purpose acceleration sensor such as a 3-axis acceleration sensor may be used.

In the present embodiment, the acceleration sensor 111 does not necessarily have to be constantly activated, but may be activated at a measurement interval T (See FIG. 5, e.g., every 4 seconds) to detect a predetermined number of accelerations.

The communication unit 113 and the communication unit 121 execute radio communication between the sensor unit 110 and the processing device 120. The radio communication method by the communication unit 113 is not particularly limited. For example, the communication method includes a method using a frequency (UHF, etc.) used in TPMS (tire pressure monitoring system) or the like, and a method in accordance with the standard of short-range wireless communication.

The communication unit 121 can communicate with a control device such as an ECU of a vehicle on which the pneumatic tire 10 is mounted, or with the outside of the vehicle via a wireless communication network.

The acceleration data acquisition unit 123 acquires acceleration data detected by the acceleration sensor 111. Specifically, the acceleration data acquisition unit 123 acquires the acceleration data at each predetermined acquisition interval.

Figure 5:
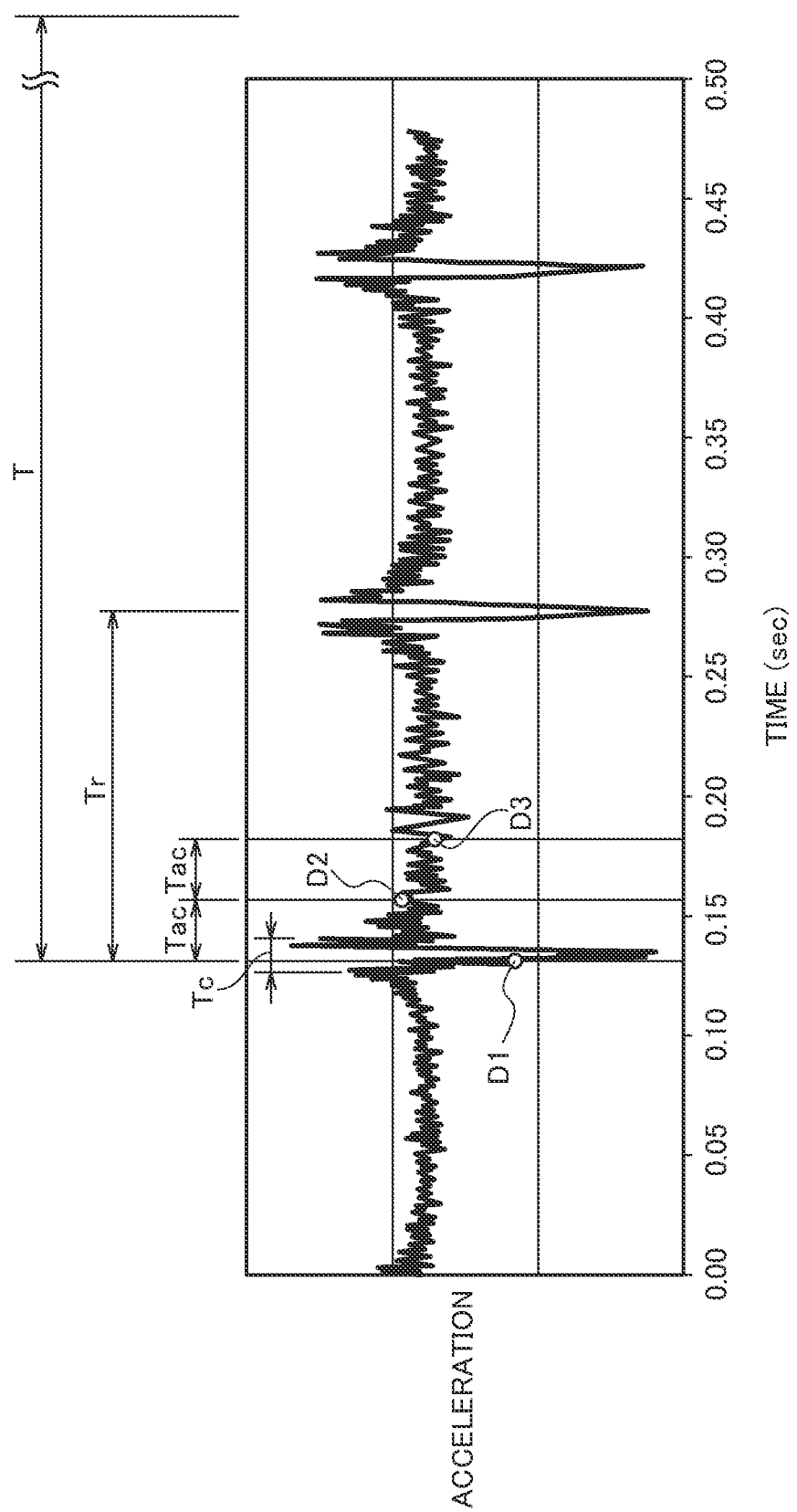
FIG. 5 shows an example of acceleration data obtained by the sensor unit 110.

FIG. 5 shows an example of acceleration data acquired by the sensor unit 110. Specifically, FIG. 5 shows an example of acceleration data in the tire radial direction acquired by the acceleration sensor 111.

Figure 3:
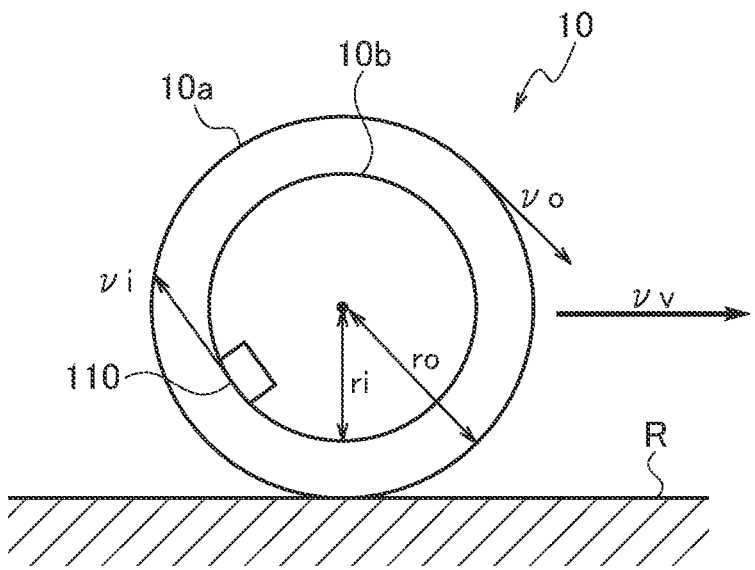
FIG. 3 shows the variables used in calculating the speed or traveling distance of the vehicle and a side surface of the pneumatic tire 10.

In FIG. 5, the section in which the acceleration is greatly reduced roughly corresponds to the grounding time Tc at which the mounting position of the sensor unit 110 (Acceleration sensor 111) and the portion of the tread 20 corresponding to the mounting position are grounded on the road surface R (See FIG. 3). The rotation period Tr indicates a time for one rotation of the pneumatic tire 10.

The acceleration data acquisition unit 123 acquires acceleration data at each acquisition interval Tac (predetermined acquisition interval), and acquires the value of acceleration in the tire radial direction detected by the acceleration sensor 111.

The acquisition interval Tac is optional, but is preferably set as follows in consideration of the power consumption of the acceleration sensor 111 and the accuracy of the vehicle speed and traveling distance calculated by the calculation unit 127.

$$\text{acquisition interval } Tac < \text{rotation period } Tr \quad \text{(Expression 1)}$$

$$\text{grounding time } Tc < \text{acquisition interval } Tac \quad \text{(Expression 2)}$$

As shown in (Expression 1), the acquisition interval Tac is preferably shorter than the rotation period Tr. That is, the acquisition interval Tac may vary depending on the speed of the vehicle on which the pneumatic tire 10 (Sensor unit 110) is mounted.

The acquisition interval Tac is preferably longer than the grounding time Tc. By satisfying (Expression 1) and (Expression 2), the acceleration data can be acquired without fail while the pneumatic tire 10 rotates once, and the acceleration data acquired in a state where the mounting position of the sensor unit 110 and the corresponding part of the tread 20 are grounded can be suppressed to 1 time.

It is not always necessary to satisfy both of (Expression 1) and (Expression 2), and only one of them may be satisfied.

Furthermore, the acceleration data acquisition unit 123 may repeat the acquisition of 3 or more acceleration data continuously acquired for each acquisition interval Tac (For example, 0.1 seconds.) for each measurement interval T (See FIG. 5, e.g., every 4 seconds). That is, the acceleration data acquisition unit 123 may repeatedly acquire the predetermined number of acceleration data of 3 or more at each measurement interval T.

The acceleration data acquisition unit 123 can adjust the acquisition interval Tac according to the diameter size of the pneumatic tire 10. Specifically, the acceleration data acquisition unit 123 increases the acquisition interval Tac as the diameter size of the pneumatic tire 10 increases, and decreases the acquisition interval Tac as the diameter size of the pneumatic tire 10 decreases. Thus, acceleration data can be acquired at appropriate timing corresponding to the diameter size (tire size) of the pneumatic tire 10.

The acceleration data extraction unit 125 extracts appropriate acceleration data for calculation in the calculation unit 127 from a plurality of acceleration data acquired by the acceleration data acquisition unit 123.

Specifically, the acceleration data extraction unit 125 extracts intermediate acceleration data from the continuous 3 or more acceleration data acquired sequentially by the acceleration data acquisition unit 123.

The intermediate acceleration data is one or a plurality of acceleration data indicating an intermediate acceleration excluding the maximum acceleration data indicating at least the maximum acceleration and the minimum acceleration data indicating the minimum acceleration.

The acceleration data extraction unit 125 generates a set of discrete acceleration data by extracting the acceleration data in this manner.

More specifically, it is preferable that the acceleration data extraction unit 125 extracts median acceleration data corresponding to a median from the continuous 3 or more acceleration data acquired sequentially by the acceleration data acquisition unit 123.

By using the median value of the acceleration data rather than the average value of the plurality of acceleration data, the influence of the instantaneous drop of acceleration due to the grounding of the tread 20 can be eliminated.

The calculation unit 127 executes calculation using the intermediate acceleration data extracted by the acceleration data extraction unit 125. Specifically, the calculation unit 127 executes calculation using the median acceleration data.

In the present embodiment, the calculation unit 127 calculates the speed or traveling distance of the vehicle on which the pneumatic tire 10 is mounted.

FIG. 3 is a diagram schematically showing a variable used for calculating the speed or the traveling distance of the vehicle and a side surface of the pneumatic tire 10.

As shown in FIG. 3, the tire outer surface 10 $a$ of the pneumatic tire 10 rolls in contact with the road surface R. The sensor unit 110 is mounted on a tire inner surface 10 $a$ of the pneumatic tire 10. As described above, the sensor unit 110 is provided with the acceleration sensor 111 (See FIG. 2).

The calculation unit 127 uses the acceleration (a) based on the acceleration data extracted by the acceleration data extraction unit 125 to calculate the rotational speed of the tire inner surface 10 $b$ (Vi), that is, the rotational speed of the acceleration sensor 111.

Specifically, the calculation unit 127 uses the to calculate the rotational speed (Vi), and further calculates the angular velocity (ω). ri is a radius from the center of the pneumatic tire 10 to the tire inner surface 10 $a$.

[Formula 1]

$$a = \frac{v_i^2}{r_i} \quad \text{(Expression 3)}$$

$$\Rightarrow v_i = \sqrt{ar_i}$$

$$\therefore \omega = \sqrt{\frac{a}{r_i}}$$

The calculation unit 127 uses the (Expression 4) to calculate the rotational speed of the tire outer surface 10 $a$ (Vo) and the vehicle speed (Vv).

[Formula 2]

$$v_V = v_o = r_o \omega = r_o \sqrt{\frac{a}{r_i}} \quad \text{(Expression 4)}$$

Here, the traveling distance (L) of the vehicle can generally be calculated using (Expression 5), but as described above, the traveling distance (L) is affected by a momentary drop in acceleration due to the grounding of the tread 20, and since the acceleration sensor 111 needs to be constantly activated, power consumption also increases.

[Formula 3]

$$L = \int v_V dt = \int r_o \sqrt{\frac{a}{r_i}} dt \quad \text{(Expression 5)}$$

Therefore, in the present embodiment, as described above, the calculation unit 127 calculates the vehicle speed (Vv) and the traveling distance (L) using the median value ($a_n$) of the acceleration indicated by at least 3 continuous acceleration data acquired for each acquisition interval Tac (see FIG. 5).

Specifically, the calculation unit 127 uses the (Expression 6) to calculate the vehicle speed (Vv) and the traveling distance (L).

[Formula 4]

$$L = \sum_n T v_{V_n} = \sum_n T r_o \sqrt{\frac{a_n}{r_i}} \quad \text{(Expression 6)}$$

The calculation unit 127 calculates the vehicle speed (Vv) and the traveling distance (L) using the median values ($a_n$) of the plurality of accelerations acquired at each measurement interval T.

The calculation unit 127 calculates the traveling distance (L) by assuming that the vehicle travels at the same speed during the measurement interval T (For example, as described above, for 4 seconds).

(3) Operation of the Tire State Detection System

Next, the operation of the tire state detection system 100 will be described. Specifically, the operation of the tire state detection system 100 for calculating the vehicle speed (Vv) and the traveling distance (L) will be described.

Figure 4:
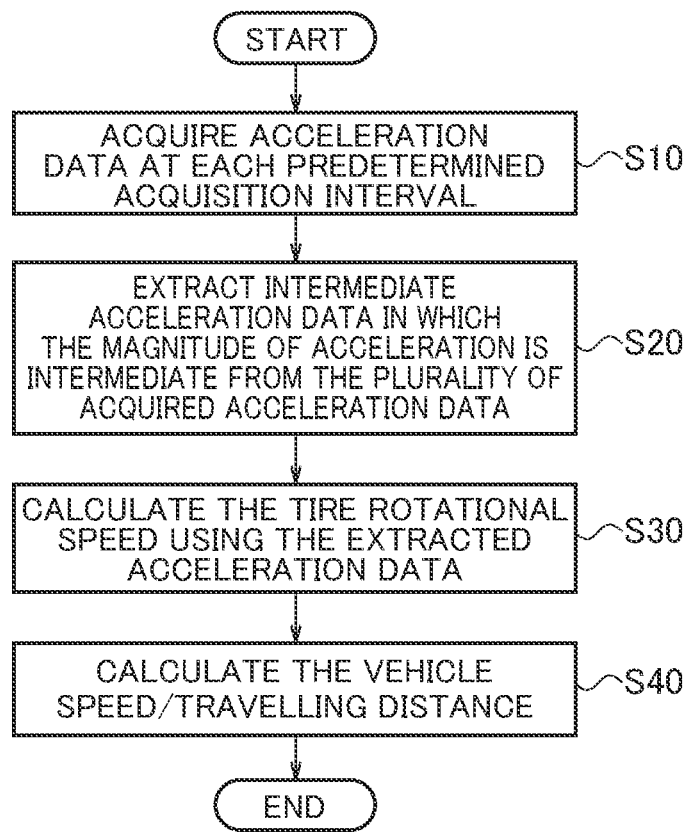
FIG. 4 shows the vehicle speed (Vv) and traveling distance (L) by the tire state detection system 100.

FIG. 4 shows the calculation operation flow of the vehicle speed (Vv) and the traveling distance (L) by the tire state detection system 100.

As shown in FIG. 4, the tire state detection system 100 (Specifically, the processing device 120, same as below) acquires acceleration data at each predetermined acquisition interval (S 10).

Specifically, as shown in FIG. 5, the tire state detection system 100 acquires a plurality of acceleration data for each acquisition interval Tac. More specifically, the tire state detection system 100 acquires continuous acceleration data of 3 or more.

In the example shown in FIG. 5, the acceleration data D1, the acceleration data D2, and the acceleration data D3 are acquired. As described above, the acceleration data D1, the acceleration data D2, and the acceleration data D3 indicate acceleration in the tire radial direction (centrifugal acceleration).

The tire state detection system 100 extracts intermediate acceleration data in which the magnitude of acceleration is intermediate from the plurality of acquired acceleration data (S 20).

Specifically, the tire state detection system 100 extracts acceleration data D3 corresponding to a median value from the acceleration data D1, the acceleration data D2, and the acceleration data D3.

That is, the tire state detection system 100 excludes the acceleration data D2 (Maximum acceleration data) indicating the maximum acceleration and the acceleration data D1 (minimum acceleration data) indicating the minimum acceleration from among the acceleration data D1, the acceleration data D2 and the acceleration data D3, and extracts the acceleration data D3 (intermediate acceleration data).

The tire state detection system 100 calculates the rotational speed (Vo) of the pneumatic tire 10 using the extracted acceleration data (S 30).

Specifically, the tire state detection system 100 applies the acceleration data D3 (median value) to the above-described (Expression 4) to calculate the rotational speed (Vo).

The tire state detection system 100 uses the calculated rotational speed (Vo) to calculate the vehicle speed (Vv) and the traveling distance (L) of the vehicle on which the pneumatic tire 10 is mounted (S 40).

Specifically, the tire state detection system 100 applies the calculated rotational speed (Vo) to the above-described (Expression 6) to calculate the vehicle speed (Vv) and the traveling distance (L).

(4) Function and Effects

According to the embodiment described above, the following effects can be obtained. Specifically, according to the tire state detection system 100, intermediate acceleration data excluding the maximum acceleration data and the minimum acceleration data is extracted from the 3 or more acceleration data sequentially acquired. Further, the vehicle speed (Vv) or the traveling distance (L) is calculated using the extracted intermediate acceleration data.

Therefore, even when the acceleration sensor 111 (Sensor unit 110) is mounted on the inner surface of the tread 20 and the detected acceleration in the tire radial direction (centrifugal acceleration) drops momentarily and greatly, the tire state can be detected without being affected by the ground contact of the part of the tread 20 corresponding to the mounting position of the acceleration sensor 111 such as the rotational speed (Vo) of the pneumatic tire 10.

In the present embodiment, the median acceleration data corresponding to the median is extracted from the sequential acceleration data of 3 or more.

Therefore, the rotational speed (Vo) can be estimated with high accuracy while eliminating the influence of the instantaneous drop of acceleration due to the grounding of the tread 20. Thus, the vehicle speed (Vv) and the traveling distance (L) can be more accurately calculated.

In this embodiment, the acquisition interval Tac (predetermined acquisition interval) can be shorter than the time for one revolution of the pneumatic tire 10 (rotation period Tr).

Therefore, since the acceleration data is always acquired during one rotation of the pneumatic tire 10, the rotational speed (Vo) can be estimated with higher accuracy. Thus, the vehicle speed (Vv) and the traveling distance (L) can be more accurately calculated.

In this embodiment, the acquisition interval Tac can be longer than the grounding time Tc of the acceleration sensor 111 (Sensor unit 110) and the corresponding portion of the tread 20.

Therefore, while the pneumatic tire 10 rotates once, the acceleration data acquired in a state where the portion of the tread 20 corresponding to the mounting position of the sensor unit 110 is grounded can be suppressed to at most 1 time. This may eliminate the possibility that the acceleration data is extracted as a median value (intermediate acceleration data). Thus, the vehicle speed (Vv) and the traveling distance (L) can be more accurately calculated.

In the present embodiment, the acquisition interval Tac can be adjusted according to the diameter size of the pneumatic tire 10.

Therefore, acceleration data can be acquired at an appropriate timing according to the diameter size of the pneumatic tire 10 (tire size). As a result, the vehicle speed (Vv) and the traveling distance (L) can be calculated more accurately.

In this embodiment, the acceleration sensor 111 does not necessarily have to be constantly activated, but may be activated at a measurement interval T (see FIG. 5) to detect a predetermined number of accelerations.

Therefore, when there is an influence due to the momentary drop of acceleration caused by the grounding of the tread 20, the power consumption of the sensor unit 110 can be suppressed, that is, the accuracy of the vehicle speed (Vv) and the traveling distance (L) can be maintained while the consumption of the battery is suppressed.

(5) Other Embodiments

While the contents of the present invention have been described in accordance with the above embodiments, it will be apparent to those skilled in the art that the present invention is not limited to these descriptions and that various modifications and improvements are possible.

For example, in the above-described embodiment, the median value is used among 3 or more acceleration data, but when the tire state detection system 100 acquires more acceleration data, the median value may not necessarily be used. Specifically, the tire state detection system 100 may use intermediate acceleration data excluding the maximum acceleration data and the minimum acceleration data.

Furthermore, the three or more acceleration data may not necessarily be sequentially acquired. That is, as long as the three or more acceleration data satisfy the above-mentioned (Expression 1) and (Expression 2), the acceleration data may not necessarily be acquired continuously.

In the above-described embodiment, the vehicle speed (Vv) and the traveling distance (L) are calculated, but only one of them may be calculated. Further, in the case of calculation using the rotational speed (Vo), for example, acceleration or deceleration of the vehicle may be calculated in addition to the vehicle speed (Vv) and the traveling distance (L).

In the above-described embodiment, the acceleration sensor 111 detects acceleration in the tire radial direction, but may detect acceleration in the tire circumferential direction. In this case, the processing device 120 may calculate the rotational speed (Vo) based on the acceleration in the tire circumferential direction.

In the above-described embodiment, the processing device 120 extracts the acceleration data and calculates the vehicle speed (Vv) and the traveling distance (L), but the processing may be executed in the sensor unit 110 or may be executed in a distributed manner using resources on the network cloud.

Although embodiments of the invention have been described as described above, the discussion and drawings which form part of this disclosure should not be construed as limiting the invention. Various alternative embodiments, embodiments and operational techniques will be apparent to those skilled in the art from this disclosure.

REFERENCE SIGNS LIST

10 Pneumatic tire
10 *a* Tire outer side
10 *b* Tire inner surface
20 Tread
100 Tire state detection system 110 Sensor unit
111 Acceleration sensor
113 Communication unit
120 Processing device
121 Communication unit
123 Acceleration data acquisition unit
125 Acceleration data extraction unit
127 Calculation unit

The invention claimed is:

1. A tire state detection system using an acceleration sensor mounted on an inner surface of a tread of a tire, comprising:
    an acceleration data acquisition unit for acquiring acceleration data detected by the acceleration sensor at every predetermined acquisition interval;
    an acceleration data extraction unit for extracting at least maximum acceleration data indicating a maximum acceleration and intermediate acceleration data indicating an intermediate acceleration excluding minimum acceleration data indicating a minimum acceleration from three or more acceleration data sequentially acquired by the acceleration data acquisition unit; and
    a calculation unit for executing a calculation using the intermediate acceleration data extracted by the acceleration data extraction unit.

2. The tire state detection system according to claim 1, wherein the acceleration data extraction unit extracts median acceleration data corresponding to a median value from three or more consecutive acceleration data acquired sequentially by the acceleration data acquisition unit; and
    the calculation unit executes a calculation using the median acceleration data.

3. The tire state detection system according to claim 1, wherein the predetermined acquisition interval is shorter than a time for one rotation of the tire.

4. The tire state detection system according to claim 1, wherein the predetermined acquisition interval is longer than a grounding time of a tread portion corresponding to the acceleration sensor.

5. The tire state detection system according to claim 1, wherein the acceleration data acquisition unit adjusts the predetermined acquisition interval according to a diameter size of the tire.

6. The tire state detection system according to claim 1, wherein the calculation unit calculates a speed or a traveling distance of a vehicle on which the tire is mounted.

7. A tire state detection method using an acceleration sensor mounted on an inner surface of a tread of a tire, the tire state detection method comprising the steps of:
    acquiring acceleration data detected by the acceleration sensor at every predetermined acquisition interval;
    extracting at least maximum acceleration data indicating a maximum acceleration and intermediate acceleration data indicating an intermediate acceleration excluding minimum acceleration data indicating a minimum acceleration from three or more acceleration data acquired sequentially; and
    executing a calculation using the extracted intermediate acceleration data.

8. The tire state detection method according to claim 7, wherein the predetermined acquisition interval is adjusted according to a diameter size of the tire.

9. A non-transitory computer-readable medium including a tire state detection program using acceleration data detected by an acceleration sensor mounted on an inner surface of a tread of a tire, the tire state detection program causing a computer to execute:
    a process of acquiring the acceleration data at each predetermined acquisition interval;
    a process of extracting at least maximum acceleration data indicating a maximum acceleration and intermediate acceleration data indicating an intermediate acceleration excluding minimum acceleration data indicating a minimum acceleration from three or more acceleration data acquired sequentially; and
    a process of executing a calculation using the extracted intermediate acceleration data.

10. The tire non-transitory computer readable medium according to claim 9, wherein the predetermined acquisition interval is adjusted according to a diameter size of the tire.

* * * * *